(12) United States Patent
Shih et al.

(10) Patent No.: US 7,655,098 B2
(45) Date of Patent: Feb. 2, 2010

(54) READYING COOLING CIRCUITS FOR USE IN FUEL CELLS

(75) Inventors: George Shih, Dearborn, MI (US); William Schwartz, Pleasant Ridge, MI (US); Chendong Huang, Ann Arbor, MI (US); Mukesh Kumar, Canton, MI (US); Byung Kim, West Bloomfield, MI (US); Sherry Mueller, Ann Arbor, MI (US); Vijay Garg, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 214 days.

(21) Appl. No.: 11/604,160

(22) Filed: Nov. 25, 2006

(65) Prior Publication Data

US 2007/0137674 A1 Jun. 21, 2007

Related U.S. Application Data

(62) Division of application No. 10/684,718, filed on Oct. 14, 2003, now abandoned.

(51) Int. Cl.
*B08B 9/02* (2006.01)

(52) U.S. Cl. .............................. 134/169 A; 134/169 C; 134/166 C; 123/41.08; 123/41.09

(58) Field of Classification Search ............. 134/168 A, 134/169 C, 166 C, 169 A; 123/198 A, 41.08, 123/41.09
See application file for complete search history.

(56) References Cited

U.S. PATENT DOCUMENTS

| | | | | |
|---|---|---|---|---|
| 4,596,749 | A * | 6/1986 | Congdon et al. | 429/14 |
| 5,094,757 | A * | 3/1992 | Light | 210/712 |
| 6,186,254 | B1 * | 2/2001 | Mufford et al. | 429/13 |
| 6,193,895 | B1 * | 2/2001 | Dea et al. | 210/765 |
| 6,316,137 | B1 * | 11/2001 | Kralick | 429/34 |
| 6,502,590 | B1 * | 1/2003 | DeBartolo et al. | 134/168 C |

* cited by examiner

*Primary Examiner*—Michael Barr
*Assistant Examiner*—Saeed T Chaudhry
(74) *Attorney, Agent, or Firm*—Tung & Associates

(57) ABSTRACT

A flush and fill process is used to ready a fuel cell cooling circuit for initial use. An external flushing system releasably connected to the cooling circuit circulates flushing coolant through the cooling circuit to remove contaminants from the wetted surfaces of the cooling circuit before the fuel cell is put into use. The flushing system includes a pump for circulating the flushing coolant through the cooling circuit, filters for removing contaminants from the coolant and a heater for elevating the temperature of the coolant. Following the flushing process to remove contaminants, the flushing system is disconnected from the cooling circuit and the cooling circuit is filled with fresh coolant.

19 Claims, 3 Drawing Sheets

READYING COOLING CIRCUITS FOR USE IN FUEL CELLS

This is a Divisional of application Ser. No. 10/684,718 filed on Oct. 14, 2003 now abandoned.

FIELD OF THE INVENTION

The present invention broadly relates to cooling circuits used in fuel cells, and deals more particularly with a method and apparatus for cleansing and filling the cooling circuit for initial use.

BACKGROUND OF THE INVENTION

Fuel cells are electro-chemical energy conversion devices that generate electricity and heat by converting the chemical energy of fuels, such as hydrogen and oxygen. A single fuel cell normally consists of an electrolyte sandwiched between two thin electrodes, a porous anode and a cathode. While a variety of differing fuel cell types have been developed, all operate on essentially the same principles. The fuel cell reaction produces heat which must be extracted from the fuel cell in order to maintain optimum operating efficiency. Sophisticated cooling and temperature control circuits have been developed for fuel cells which closely control operating temperatures. These cooling circuits typically include channelized plates or passageways within the fuel cell through which a coolant such as de-ionized water may flow to carry heat away from the fuel cell to a heat exchanger or other device for dissipating the heat.

In the case of fuel cells used to power vehicles such as an automobile, the cooling circuit is located on-board the vehicle and may include a variety of subsystems such as filters and temperature controllers for conditioning the coolant. The condition of the coolant, and particularly its purity, affect the efficiency of the coolant to conduct heat away from the fuel cell. Ideally, the coolant should not contain particulate contaminants greater than a very small size and should have near zero electrical conductivity. As a practical matter however, the coolant picks up small particulates contaminants and conductive ions as it flows through the cooling circuit. Various types of on-board particulate filters and de-ionization filters have been devised to remove these contaminants, however these devices are often limited in their ability to remove contaminants, and in any event must be periodically serviced or replaced due to contaminate buildup. Part of the inefficiency of prior filters and rapid contaminate buildup is due to the fact that a certain amount of the contaminants is present on the wetted surfaces of the component parts of the cooling system at the time of their installation and assembly. Consequently, on initial start-up of the fuel cell, the coolant flowing through the cooling circuit carries these initial contaminants away, resulting in an immediate buildup of contaminates in the filters, in turn reducing the overall efficiency of the cooling circuit.

It would therefore be desirable to reduce the level of contaminants present in the cooling circuit before it is filled with coolant and put into use. The present invention is directed towards satisfying this need.

SUMMARY OF THE INVENTION

A method is provided for readying a fuel cell cooling circuit for use, comprising flushing the cooling circuit to remove contaminants from the wetted surfaces of the cooling circuit, and then filling the cooling circuit with a volume of fresh coolant. The cooling circuit is flushed using an external flushing system which is removably connected to the cooling circuit at the time the fuel cell is being readied for its initial use. The flushing system includes a supply of coolant, filters for removing contaminants from the coolant and a series of valves for controlling the flow of coolant between the flushing system and the cooling circuit. Particulate contaminants and conductivity increasing ions present within the component parts of the cooling circuit are carried away by the flushing coolant to filters forming part of the flushing system where they are filtered out of the flushing coolant. The temperature and pressure of the flushing coolant is regulated to enhance contaminant removal and protect fuel cell components against excessive pressure. The cooling circuit is flushed for a pre-selected time period, following which all coolant is removed from the cooling circuit and the flushing system is disconnected from the cooling circuit. After the flushing coolant is removed from the cooling circuit, fresh coolant is introduced into the cooling circuit to ready the fuel cell for use.

Apparatus is provided for cleansing a fuel cell cooling circuit, comprising a flushing system removably connected to the cooling circuit for flushing the cooling circuit of contaminants. The flushing system includes a supply of flushing coolant, a filtering system for removing contaminants from the flushing coolant, and a pump for circulating a volume of coolant between the cooling circuit and the flushing system. The filtering system desirably includes both particulate filters and a de-ionization filter. The flushing system further includes a pressure regulator for regulating the pressure of the coolant circulated from the flushing system to the cooling circuit, and optionally also includes a heater for heating the coolant to a temperature that is sufficient to promote the removal of contaminants from component parts of the cooling circuit. The flushing system also includes a series of shut-off valves which may be controlled manually or automatically to control the flow of flushing coolant between the flushing system and the cooling circuit.

The invention advantageously reduces the level of contaminants present in the cooling circuit when the fuel cell is initially put into service, thereby increasing fuel cell efficiency and fuel cell temperature control.

Another advantage of the invention is that the contaminant filters forming part of the cooling circuit are not used to filter out contaminants that are present in the coolant upon start-up of the fuel cell, consequently, the filters are capable of operating with greater efficiency and longer service life.

A further advantage of the invention is that larger contaminating particles present in the coolant circuit at the time of manufacture are flushed from the cooling circuit before the start-up of the fuel cell.

These, and other advantages of the invention will be made clear or will become apparent during the course of the following description of a preferred embodiment of the present invention. In the course of this description, reference will frequently be made to the attached drawings.

DETAILED DESCRIPTION OF THE PREFERRED EMBODIMENT

Figure 1:
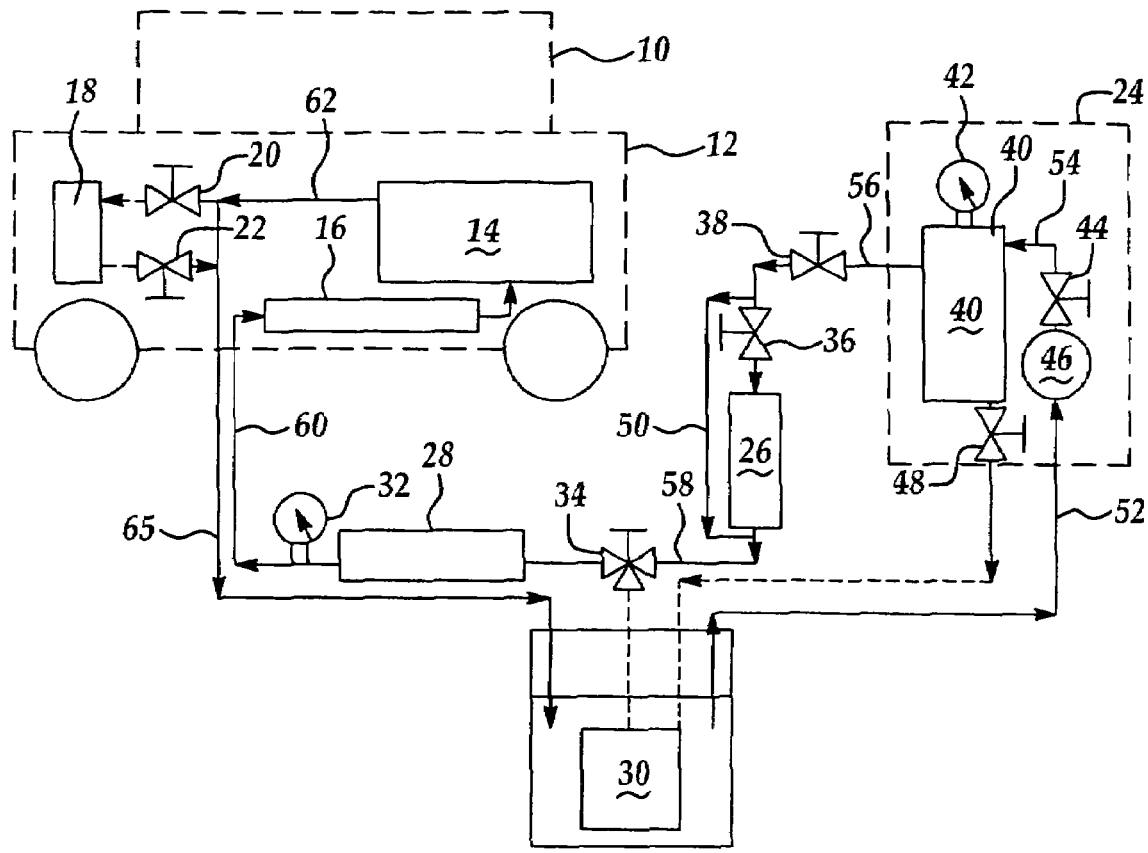
FIG. 1 is a combined schematic and diagrammatic view of a flushing system connected to a cooling circuit for a fuel cell, according to the preferred embodiment of the invention.

Referring first to FIG. 1, a vehicle 10 includes an on-board fuel cell system 12, including a fuel cell 14 which generates electrical power used to drive the vehicle 10 or operate auxiliary electrical systems on-board the vehicle 10. The fuel cell 14 may be of any of various types which convert fuels such as hydrogen and oxygen into electricity through electro-chemical conversion. A by-product of the conversion process is heat generated within the fuel cell 14 which must be dissipated or carried away from the fuel cell 14. Accordingly, the fuel cell system 12 includes a cooling circuit which typically will include heat exchangers (not shown), coolant carrying lines, valves and other control devices for controlling the flow of a coolant, such as de-ionized water through the cooling circuit in order to carry heat away from the fuel cell 14. Such on-board circuits typically include a particulate filter 16 for filtering contaminants from a coolant, and a de-ionization filter 18 for removing conductivity increasing ions from the coolant.

In accordance with the present invention a flushing system is provided external to the vehicle 10 which is removably connected to the cooling circuit by releasable coolant line connections (not shown) located at points on the vehicle 10, designated by the letters "A" and "B".

The flushing system broadly includes a coolant storage tank 30, pump 46, particle filter tank 40, de-ionization filter 26, coolant heater 28 and a series of later discussed valves which control flow of coolant between the flushing system and the on-board cooling circuit. The fluid connections coupling the flushing system to the cooling circuit at points "A" and "B" are of preferably of the quick-release type which is well known in the art.

The coolant storage tank 30 is filled with a fixed volume of a suitable coolant such as de-ionized water. Pump 46 draws the coolant from the tank 30 into the particle filter tank 40. The flow rate into the filter tank 40 is controlled by a shut-off valve 44. The filter tank 40 is pressurized, and a pressure gage 42 is provided to indicate the pressure of the coolant in the tank 40, and therefore the flushing system lines. The filter tank 40 is connected to the coolant storage tank 30 through a shut-off valve 48 which, when in the open position, allows any remaining coolant in filter tank 40 to flow back into storage tank 30. The pump 46 together with the filter tank 40 and shut-off valve 44, 48 form a flushing machine 24.

Coolant present in filter tank 40 is delivered under pressure through line 56 through a shut-off valve 38 to both a by-pass line 50 and another shut-off valve 36 immediately upstream of the de-ionization filter 26. The by-pass line 50 allows a desired amount of the coolant to by-pass the de-ionization filter, as determined by the opening position of shut-off valves 36 and 38. Valve 36 specifically limits the flow through the filter 26 so that the capacity of this filter to remove and process the coolant is not exceeded. Coolant exiting the filter 26 is delivered by line 58 through a three-way valve 34 to an optional coolant heater 28. As will become apparent later, the three-way valve may be actuated at the end of the flushing cycle to allow coolant present in line 58 to flow back into the storage tank 30. During the flushing cycle, however, valve 34 is switched to a position that forces all flow of coolant in line 58 to be delivered to the coolant heater 28.

Although satisfactory results may be realized when the flushing coolant is at ambient temperature, it has been found that superior results may be achieved if the coolant is heated to a temperature sufficient to promote the removal of contaminants from the wetted surfaces of the components that make up the cooling circuit. Superior contaminant removal has been achieved when the coolant is heated to a temperature of approximately 80° C. A temperature gage 32 and related temperature sensor (not shown) are provided at the exit of the coolant heater in order to sense and indicate the temperature of the coolant exiting the heater 28. The heated coolant is delivered by flushing line 60 to a connection at "A" which feeds into an on-board particulate filter 16. Although some contaminants may be filtered out by the filter 16, most of the particulates have been previously filtered in the filter tank 40. The flushing coolant passes from the particulate filter 16 through the heat exchanging passageways in the fuel cell 14 and are carried away from the fuel cell by cooling circuit line 62.

Normally, the coolant exiting the fuel cell 14 in line 62 is delivered to the on-board de-ionization filter 18. However, in accordance with the present invention, a pair of shut off valves 20, 22 are provided which block the flow of coolant to the filter 18, and instead, re-route the flow so as to by-pass the filter 18 and deliver the coolant back through the flushing system line 65 to the storage tank 30.

When the flushing system is initially connected to the on-board cooling circuit at points "A" and "B", the cooling circuit is empty of coolant and is ready for a flushing cycle. A fixed quantity of the flushing coolant is stored in tank 30. The shuttle valve 44 is adjusted between its fully open and fully closed positions to regulate the pressure in the system to keep it below the safe limits that can be tolerated by the fuel cell 14. Initially, shut-off valve 38 is closed to allow the filter tank 44 to be filled with coolant drawn from the storage tank 30. Once filled, shut-off valve 38 is opened and coolant flows both through shut-off valve 36 to the filter 26 and through the by-pass line 50. Shut-off valve 36 regulates the amount of coolant which flows through the filter 26. The on-board particulate filter 16 removes any particles that may have entered the coolant between the time it flows from the filter tank 40 to the vehicle 10.

Although the flushing system described above may be operated manually, it may be desirable in some applications to use a partially or fully automated control system. In this respect, attention is now directed also to FIG. 2 which shows a controller 64 for operating the flushing system. The controller 64 may be a conventional, programmable logic controller (PLC) operating under programmed instructions to carry out the various control functions in accordance with real-time information supplied to the controller 64. The controller 64 delivers output control signals to operate the coolant heater 28, pump 46 and the various, previously described shut-off valves which, for sake of simplicity, are collectively shown in FIG. 2 as a valve system 72. The controller 64 receives real time data from a pressure sensor 66, storage tank level sensor 68, flow sensor 69, coolant quality sensor 71 and temperature sensor 70.

Figure 2:
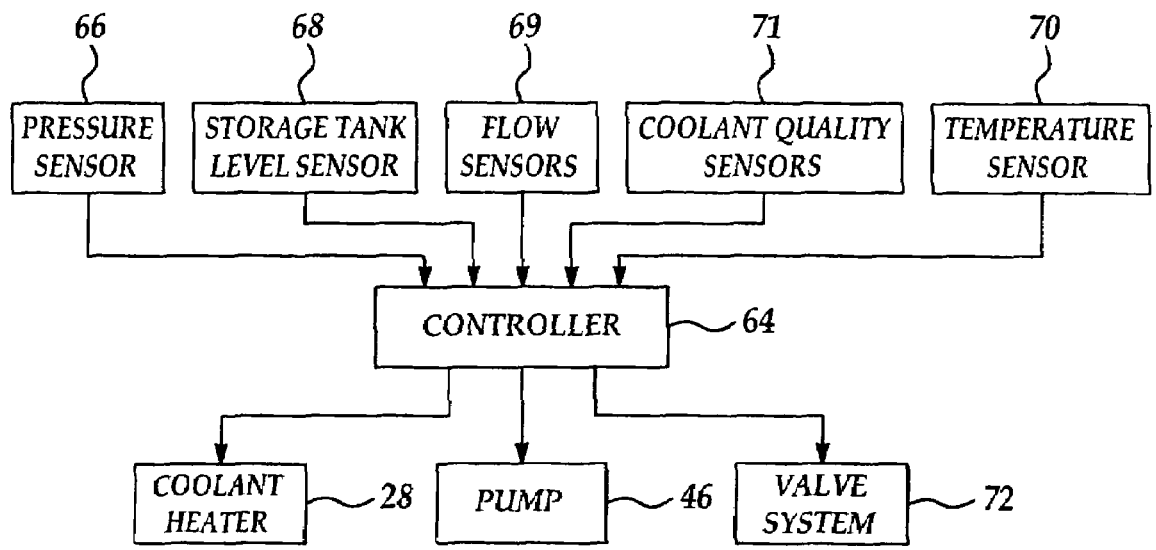
FIG. 2 is a block diagram of a control system for the flushing system shown in FIG. 1.

The pressure sensor 66, as previously mentioned, senses the pressure within the filter tank 40 which is also displayed on the pressure gauge 42. A conventional level sensor 68 may be provided in the storage tank 32 to verify that the correct amount of coolant is present in the tank 30 before the flushing cycle commences and to verify that the proper flow rates are being achieved, as determined by the rate of coolant returned to the tank 30 and via line 65. Although not shown in FIG. 1, one or more flow sensors 69 may be incorporated into various flushing system and cooling circuit lines to measure flow rates. One or more coolant quality sensors 71 may be provided to determine certain characteristics of the coolant indicating its purity or quality. One such device would be a conductivity sensor for determining the level of conductivity increasing ions present in the coolant. The various components forming the control system shown in FIG. 2 are conventional, commercially available items, consequently their details need not be described here.

Figure 3A:
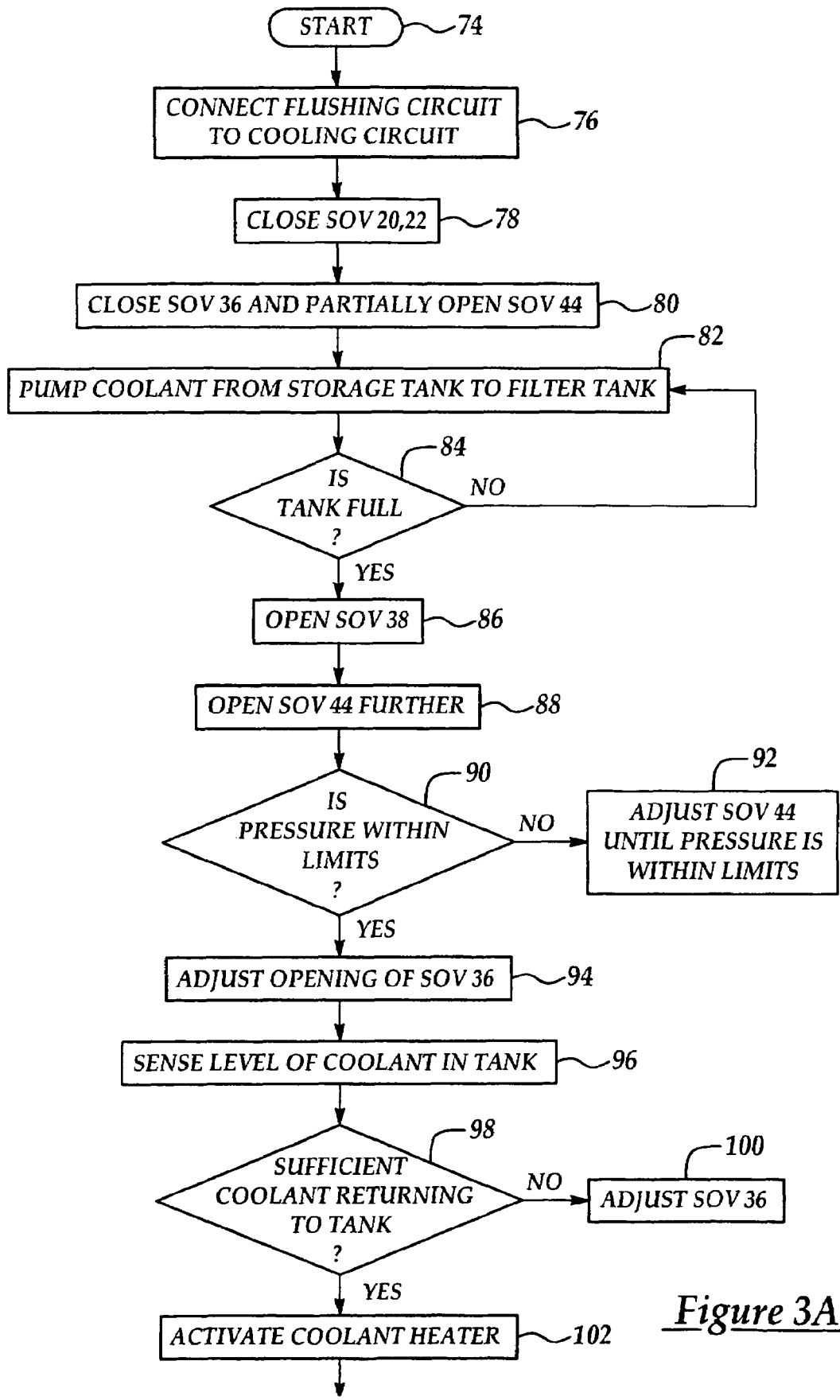
FIGS. 3a and 3b taken together, form a flow chart of the steps used to carry out the method for readying a fuel cell according to the present invention.
Figure 3B:
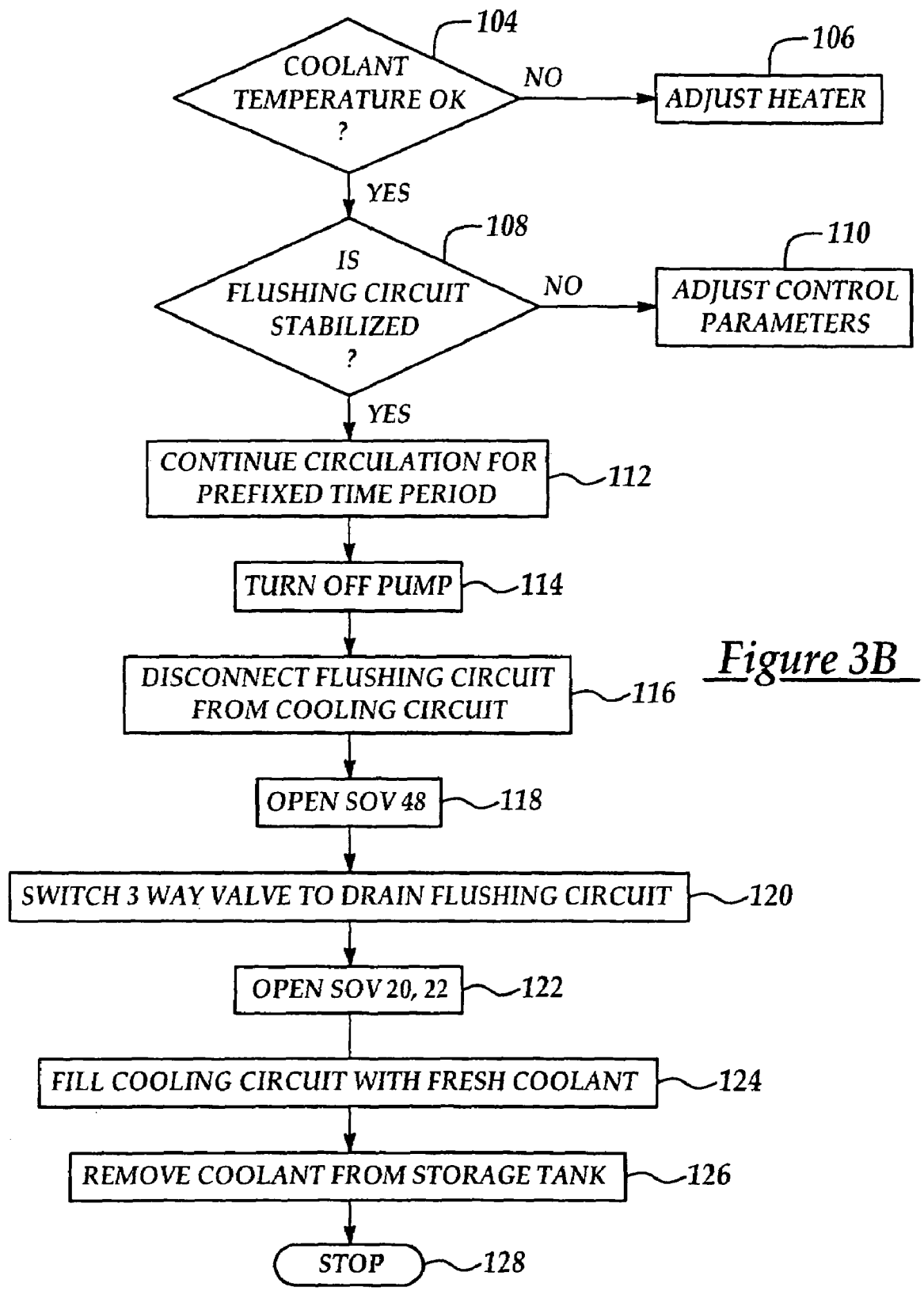

Reference is also now made to FIGS. 3a and 3b which, taken together, depict success steps used in carrying out the inventive method by which the fuel cell coolant circuit 12 is readied for use. The method starts at step 74 with a fixed volume of flushing coolant present in the storage tank 30. The flushing system is connected to the cooling circuit at step 76. This involves connecting the cooling carrying lines of the flushing system to quick release couplings on-board the vehicle, at points "A" and "B", as previously described. Next, shut-off valves 20 and 22 are closed at step 78, thereby causing the flushing coolant flowing out of the fuel cell 14 on line 62 to bypass the filter 18. Next, at step 80, shut-off valve 38 is closed and shut off valve 44 is partially opened. Then, at step 82, pump 46 is activated, causing coolant in tank 30 to flow through lines 52 and 54 into the filter tank. This filling procedure is continued until the tank is full at step 84, following which shut off valve 38 is opened at step 86.

At step 88, the shuttle valve 44 is opened slightly further to increase the flow of coolant entering the tank 40, until coolant within the tank 40 is within desired pressure levels indicated at 90. If the pressure is above or below the desired limits, shut-off valve 44 is adjusted as required, at step 92. Once the desired pressure within the tank is achieved, shut-off valve 36 is adjusted to achieve a desired flow rate through the deionization filter 26. Because the de-ionization filter 26 represents a flow constriction that creates fluid back pressure, there is a limit to the amount of coolant that may be passed through the filter 26. In step 96, the level of coolant in the storage tank 30 is assessed, and when it is determined that sufficient coolant is returning to the tank 30 (via line 65) as evidenced by the fluid level in the tank, the coolant heater 29 is activated at step 102. In the event that insufficient coolant is being returned to the tank 30, the shut-off valve 36 is adjusted to increase the flow, at step 100.

At step 104, a previously described temperature sensor 70 determines whether the temperature of the coolant has been elevated to a desired level, for example 80° C. If the temperature is out of range, the heater 28 is adjusted at step 106, otherwise a determination is made at 108 of whether the flow of flushing coolant through the flushing system and the coolant circuit has stabilized, i.e. proper coolant temperature, pressure and flow rates. If the flushing system does not stabilize, steps are taken to adjust the control parameters at step 110. Otherwise, at step 112, the flushing coolant is allowed to circulate from the flushing system to the coolant circuit for a period of time necessary to remove coolant contaminants at a specified level. In one application, it was found that a circulation period of approximately 40 minutes was appropriate, however the exact duration will depend on a variety of factors unique to each specific fuel cell application. The circulation period may be adjusted upwardly of downwardly depending upon real time information gathered by sensors measuring the purity and quality of the coolant, such as the previously mentioned conductivity sensor.

At the end of the circulation period, the pump 46 is turned off at step 114, following which the flushing system may be disconnected from the coolant circuit in step 116. With the flushing system disconnected from the vehicle 10, all of the flushing coolant present within the flushing system must be removed. Consequently, first, shut-off valve 38 is opened at step 118, and at step 120 the three-way valve 34 is switched to a position which drains coolant in lines 58 and 60 back into the storage tank 30. Shut-off valves, 20, 22 on-board vehicle 10 are opened, at step 122, thereby re-connecting filter 18 into the on-board cooling circuit.

Next, at step 124, the on-board cooling circuit is filled with fresh coolant, thereby readying the fuel cell system 12 for initial use, At step 126, all of the coolant present in storage tank 30 is removed and may be subjected to reclamation or re-cycling processes to renew the coolant for future use. A fresh quantity of flushing coolant is then introduced into the tank 30, thereby readying the flushing system for flushing the next fuel cell system 12, and completing the last step in the process, as indicated at block 128.

From the foregoing, it may be appreciated that the method and apparatus for readying a fuel cell cooling circuit described above not only provide numerous advantages, but do so in a particularly simple and economic manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

The invention claimed is:

1. Apparatus for cleansing a fuel cell cooling circuit, comprising:
   a flushing system connected to the fuel cell cooling circuit for flushing the cooling circuit of contaminants, said cooling circuit comprising a particulate filter and a deionization filter for removing contaminants from a first coolant flowing to the fuel cell; and,
   the flushing system including a supply of second coolant, a filtering system for removing contaminants from the second coolant flowing through the flushing system to the fuel cell cooling circuit, and a pump for circulating a volume of the second coolant between the cooling circuit and the flushing system, said cooling circuit comprising a bypass system for causing the flow of said second coolant to selectively bypass the cooling circuit de-ionization filter wherein the filtering system includes a particulate filter and a de-ionization filter.

2. The apparatus of claim 1, wherein the flushing system includes a pressure regulator for regulating the pressure of the coolant circulated from the flushing system to the cooling circuit.

3. The apparatus of claim 2, wherein the pressure regulator includes a flow control valve connected between the pump and the cooling circuit for controlling the flow of coolant flowing from the flushing system to the cooling circuit.

4. The apparatus of claim 1, including a valve system for controlling the flow of the coolant between the coolant supply, the cooling circuit and the flushing system.

5. The apparatus of claim 1, wherein the flushing system includes a heater for heating the coolant circulated from the flushing system to the cooling circuit to a temperature sufficient to promote the removal of contaminants from component parts of the cooling circuit.

6. The apparatus of claim 1, including a controller for controlling operation of the pump and the valve system.

7. The apparatus of claim 1, wherein the flushing system is releasably connected to the cooling circuit.

8. Apparatus for cleansing a fuel cell cooling circuit, comprising:
   a flushing system connected to the fuel cell cooling circuit for flushing the cooling circuit of contaminants, said cooling circuit comprising a first particulate filter and a first deionization filter for removing contaminants from a first coolant flowing to the fuel cell; and, the flushing system including a supply of second coolant, a filtering system for removing contaminants from the second coolant flowing through the flushing system to the fuel cell cooling circuit, and a pump for circulating a volume of the coolant between the cooling circuit and the flushing system;

wherein said cooling circuit further comprises a bypass system for causing the flow of coolant to selectively bypass the first de-ionization filter when the flushing system is flushing the cooling circuit of contaminants;

wherein the flushing system is releasably connected to the cooling circuit wherein the filtering system includes a second particulate filter and a second de-ionization filter.

9. The apparatus of claim 8, wherein the flushing system includes a pressure regulator for regulating the pressure of the coolant circulated from the flushing system to the cooling circuit.

10. The apparatus of claim 9, wherein the pressure regulator includes a flow control valve connected between the pump and the cooling circuit for controlling the flow of coolant flowing from the flushing system to the cooling circuit.

11. The apparatus of claim 8, including a valve system for controlling the flow of the coolant between the coolant supply, the cooling circuit and the flushing system.

12. The apparatus of claim 8, wherein the flushing system includes a heater for heating the coolant circulated from the flushing system to the cooling circuit to a temperature sufficient to promote the removal of contaminants from component parts of the cooling circuit.

13. The apparatus of claim 8, including a controller for controlling operation of the pump and the valve system.

14. Apparatus for cleansing a fuel cell cooling circuit, comprising:

a flushing system connected to the fuel cell cooling circuit for flushing the cooling circuit of contaminants, said cooling circuit comprising a first particulate filter and a first deionization filter for removing contaminants from a first coolant flowing to the fuel cell;

the flushing system including a supply of second coolant, a filtering system for removing contaminants from the second coolant flowing through the flushing system to the fuel cell cooling circuit, said filtering system comprising a second particulate filter and a second de-ionization filter, and a pump for circulating a volume of the coolant between the cooling circuit and the flushing system;

wherein said cooling circuit further comprises a bypass system for causing the flow of coolant to selectively bypass the first de-ionization filter when the flushing system is flushing the cooling circuit of contaminants;

wherein the flushing system is releasably connected to the cooling circuit.

15. The apparatus of claim 14, wherein the flushing system includes a pressure regulator for regulating the pressure of the coolant circulated from the flushing system to the cooling circuit.

16. The apparatus of claim 15, wherein the pressure regulator includes a flow control valve connected between the pump and the cooling circuit for controlling the flow of coolant flowing from the flushing system to the cooling circuit.

17. The apparatus of claim 14, including a valve system for controlling the flow of the coolant between the coolant supply, the cooling circuit and the flushing system.

18. The apparatus of claim 14, wherein the flushing system includes a heater for heating the coolant circulated from the flushing system to the cooling circuit to a temperature sufficient to promote the removal of contaminants from component parts of the cooling circuit.

19. The apparatus of claim 14, including a controller for controlling operation of the pump and the valve system.

* * * * *